United States Patent [19]

Yamamoto et al.

[11] Patent Number: 5,094,469
[45] Date of Patent: Mar. 10, 1992

[54] TRAILER HITCH DEVICE FOR MOTOR VEHICLES

[75] Inventors: Akihito Yamamoto; Michihiro Kawamura; Yasunori Kumagai; Kenichi Sato, all of Gunma, Japan

[73] Assignee: Fuji Jukogyo Kabushiki Kaisha, Tokyo, Japan

[21] Appl. No.: 615,885

[22] Filed: Nov. 20, 1990

[30] Foreign Application Priority Data

Nov. 29, 1989 [JP] Japan ............... 1-138541[U]

[51] Int. Cl.⁵ ............................................. B60D 1/00
[52] U.S. Cl. ................................. 280/500; 280/505; 280/511; 293/117; 293/146
[58] Field of Search ............... 280/500, 505, 511; 293/116, 117, 121, 146

[56] References Cited

U.S. PATENT DOCUMENTS

| | | | |
|---|---|---|---|
| 2,151,920 | 3/1939 | Jandus et al. | 293/117 |
| 3,463,514 | 8/1969 | Warner | 280/500 |
| 4,204,702 | 5/1980 | Oltrogge | 280/500 |
| 4,610,458 | 9/1986 | Garnham | 293/117 |
| 4,620,736 | 11/1986 | Shanks | 280/500 |
| 4,929,028 | 5/1990 | Underwood | 293/116 |

FOREIGN PATENT DOCUMENTS

| | | | |
|---|---|---|---|
| 2339637 | 2/1975 | Fed. Rep. of Germany | 280/500 |
| 3020997 | 2/1982 | Fed. Rep. of Germany | 293/121 |
| 2558774 | 8/1985 | France | 280/511 |
| 258446 | 9/1926 | United Kingdom | 293/146 |

Primary Examiner—Kenneth R. Rice
Attorney, Agent, or Firm—Beveridge, DeGrandi & Weilacher

[57] ABSTRACT

In a trailer hitch device for a motor vehicle wherein a trailer hitch is mounted on a member beam, the improvement comprising the fact that the member beam has both its ends respectively fixed to right and left rear bumper stays and is covered with a rear bumper face, and that the trailer hitch is fixed to the member beam and has its coupling bowl portion at its distal end protruded rearward of the vehicle body of the vehicle through an opening provided in the bumper face.

3 Claims, 6 Drawing Sheets

TRAILER HITCH DEVICE FOR MOTOR VEHICLES

BACKGROUND OF THE INVENTION:

The present invention relates to a trailer hitch device for motor vehicles which serves to draw a trailer or the like.

Regarding such a trailer hitch device for motor vehicles, there has heretofore been known one shown in FIGS. 10 thru 12.

This device is of a structure which is fixed under the floor of a vehicle body near a rear bumper. It comprises a member beam 3 which is supported by the vehicle body floor 2 through brackets 1 fixed to both the ends thereof, and a trailer hitch 4 whose base end is fixed to the middle part of the member beam 3 and which is provided at its distal end with a coupling bowl 4a protruding rearwards from under the rear bumper 5. An example which is fixed under the floor through the brackets in this manner, is also stated in the official gazette of Japanese Utility Model Registration Application Laid-open No. 114704/1980.

With the prior-art example, the trailer hitch device is generally exposed under the floor at the rear part of the vehicle body. Therefore, the example has the problems that the external appearance of the rear part of the motor vehicle is spoiled, and that the departure angle of the vehicle body is sacrificed.

Moreover, the fixation of the trailer hitch device to the vehicle body floor is prone to become disadvantageous in strength and necessitates to stiffen the vehicle body floor.

SUMMARY OF THE INVENTION:

Accordingly, the present invention has for its object to provide a trailer hitch device with which the external appearance of the rear part of a motor vehicle is favorable, with which the departure angle of a vehicle body is sufficiently secured and which is advantageous in strength.

In order to accomplish the object, a trailer hitch device for motor vehicles according to the present invention comprises a member beam whose both ends are respectively fixed to right and left rear bumper stays of a rear bumper of the motor vehicle and which is covered with a rear bumper face of the rear bumper, and a trailer hitch which is fixed to said member beam and whose coupling bowl portion at its distal end protrudes rearward of a vehicle body of the vehicle through an opening provided in the bumper face.

According to such an expedient, the member beam which is a mounting member for the trailer hitch is covered with the rear bumper face, so that the external appearance of the rear part of the motor vehicle becomes favorable.

Besides, the member beam is located at a position which is covered with the rear bumper face, so that the departure angle of the vehicle body is sufficiently secured.

Further, the member beam is fixed to the rear bumper stays, so that the expedient is more advantageous in strength as compared with the fixation to the vehicle body floor.

DETAILED DESCRIPTION OF THE PREFERRED EMBODIMENTS

Now, an embodiment of the present invention will be concretely described with reference to the accompanying drawings.

Figure 1:
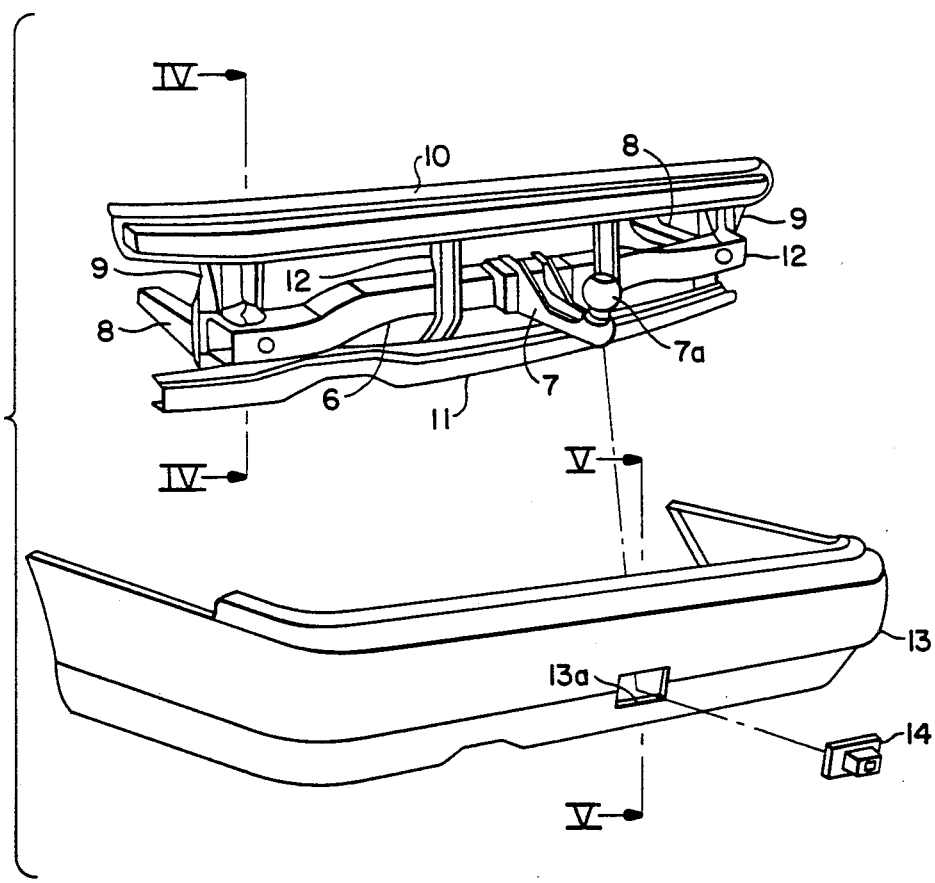
FIG. 1 is an exploded perspective view showing the general construction of an embodiment of the present invention.

Referring to FIG. 1, numeral 6 designates a member beam which is formed of a square pipe, and the base end of a trailer hitch 7 which has a coupling ball 7a at its distal end is fixed to the middle part of the member beam 6 in the longitudinal direction thereof. In addition, numerals 8, 8 indicate a pair of, right ad left rear bumper stays to which both the ends of the member beam 6 are respectively fixed, and which support an upper bumper beam 10 and a lower bumper beam 11 through brackets 9, 9 so as to extend them laterally.

The upper bumper beam 10 and the lower bumper beam 11 are connected through connecting members 12, 12 so as to lie one over the other, and a rear bumper face 13 which is mounted with these beams as supporting members is provided with an opening 13a through which the trailer hitch 7 penetrates and in which a boot 14 is fitted.

Figure 2:
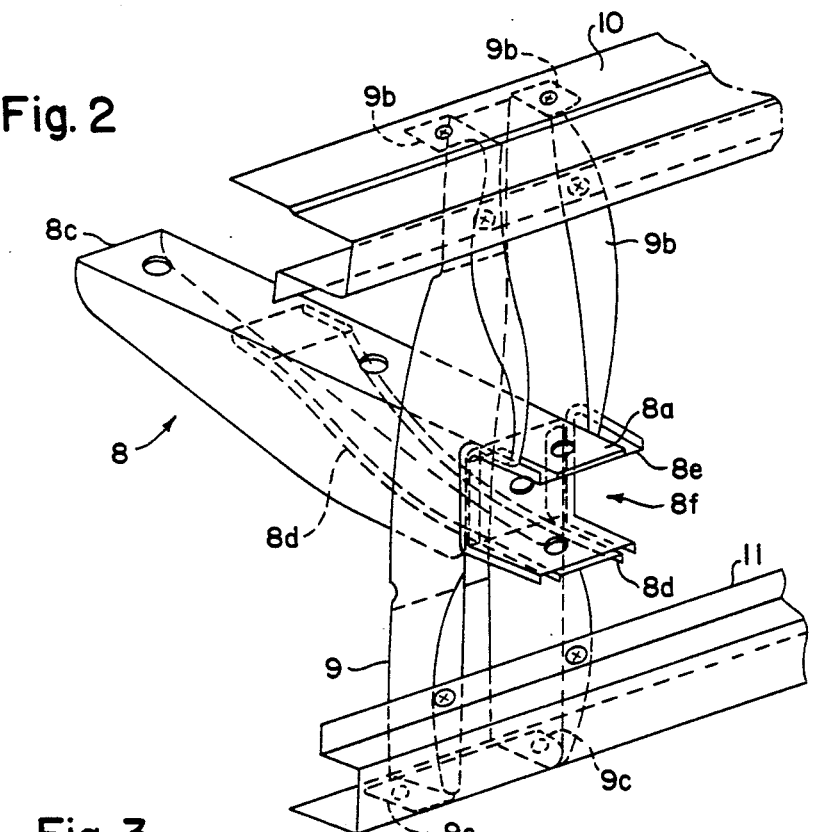
FIG. 2 is a perspective view of the essential portions of the embodiment.
Figure 3:
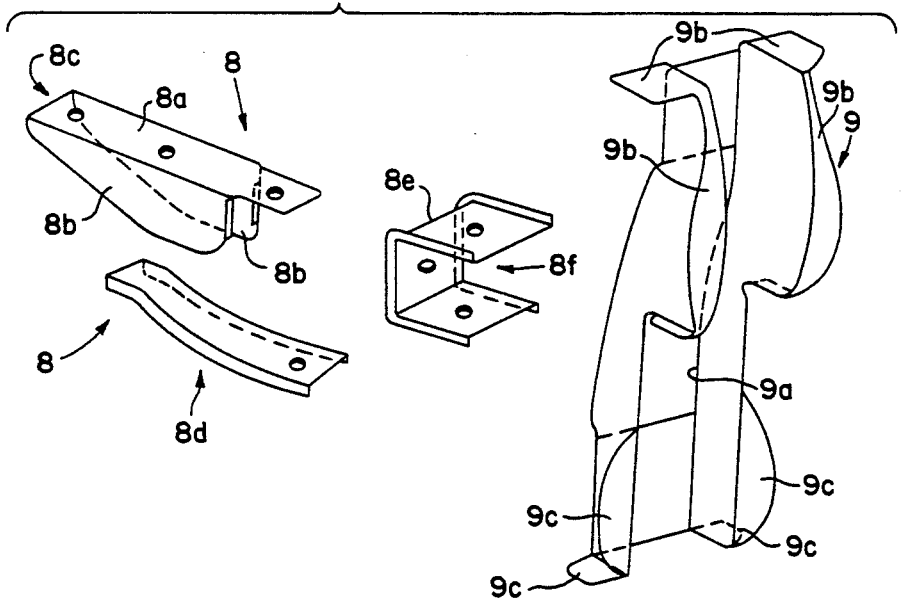
FIG. 3 is an exploded perspective view of the essential portions of the embodiment.

FIG. 2 shows the vicinity of the rear bumper stay 8 as well as the bracket 9 on an enlarged scale. Here, the rear bumper stay 8 is configured, as clearly seen from FIG. 3, of a first element 8c in which bent vertical walls 8b, 8b are formed on both the sides of a surface 8a to be mounted on the vehicle body, except the rear end part of the mounting surface, a second element 8d which is inserted inside the vertical walls 8b, 8b of the first element 8c and the fore end part of which is welded and fixed to the back surface of the mounting surface 8a, and a third element 8e which is bent and formed into a U-shape open rearward and which is fitted in the rear end parts of the first element 8c and the second element 8d, and it is shaped so as to define at its rear end a groove 8f which embraces the corresponding end of the member beam 6. In addition, the rear bumper stay 8 has its rear end part inserted through the slot 9a of the bracket 9 extending vertically.

The bracket 9 is generally bent and formed into a U-shaped cross-section open rearward, and is welded and fixed to the rear bumper stay 8. Mounting pieces 9b, 9c are respectively bent and formed at the upper and lower ends of the bracket 9. Besides, the corresponding end of the upper bumper beam 10 is welded and fixed to the bracket 9 through the upper mounting pieces 9b, while the corresponding end of the lower bumper beam 11 is welded and fixed thereto through the lower mounting pieces 9c (refer to FIG. 2).

Figure 4:
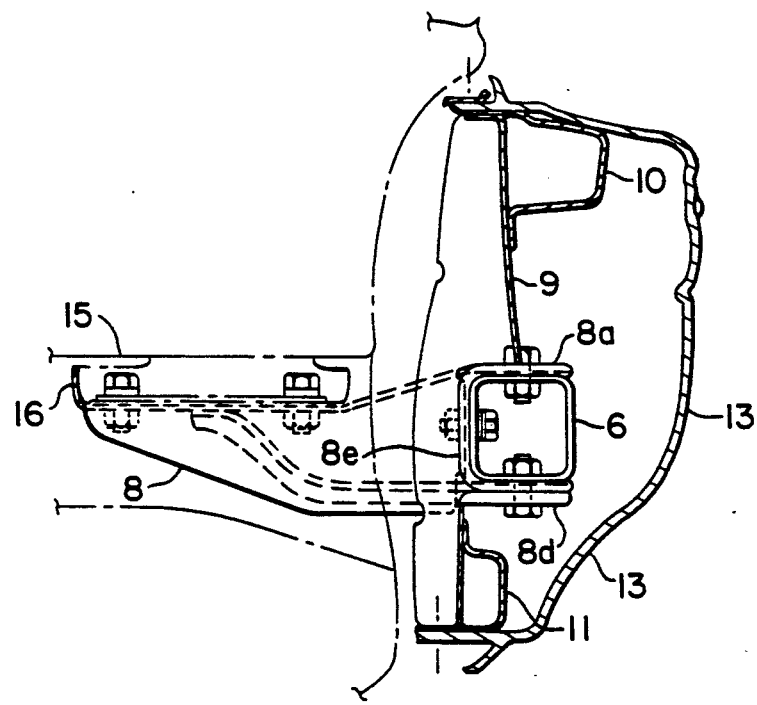
FIG. 4 is a sectional view taken along line IV—IV in FIG. 1.

Here, as shown in FIG. 4, a supporting bracket 16 is fixed to a vehicle body floor 15, and the fore end part of the rear bumper stay 8 is connected to the supporting bracket 16 by bolts. In addition, the corresponding end of the member beam 6 is inserted in the groove 8f at the rear end of the rear bumper stay 8 as stated above and is connected to this rear end by bolts. More specifically, the side part of the member beam 6 is bolted to the third element 8e, the upper part thereof to the third element 8e and the mounting surface 8a of the first element 8c, and the lower part thereof to the third element 8e and the second element 8d.

Figure 5:
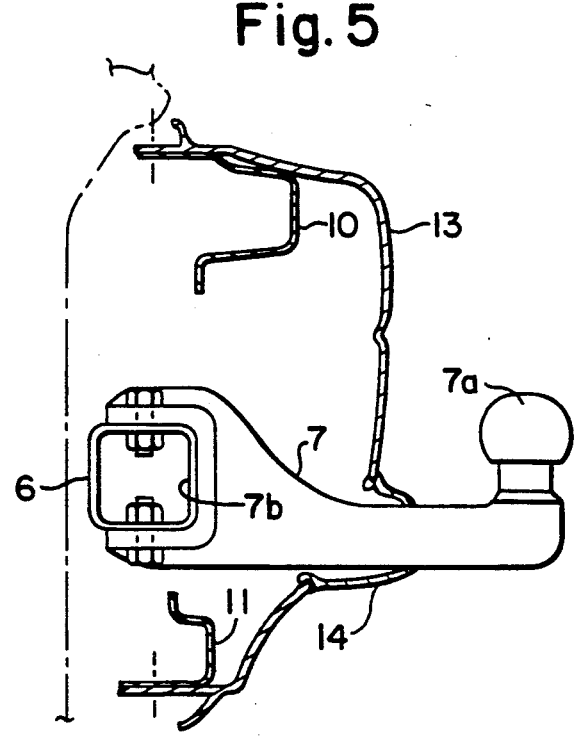
FIG. 5 is a sectional view taken along line V—V in FIG. 1.

Besides, as shown in FIG. 5, the trailer hitch 7 is connected to the member beam 6 by bolts in the state in which a groove 7b formed at the base end part of this trailer hitch is held in snug engagement with the member beam 6, and the trailer hitch 7 has the coupling ball 7a at its distal end protruded rearward of the rear bumper face 13 through the boot 14.

Figure 6:
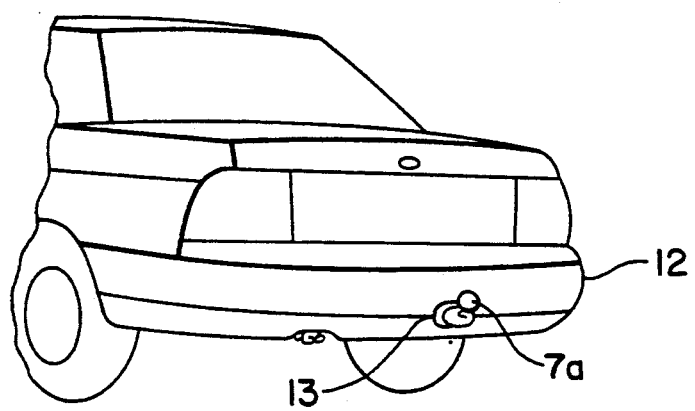
FIG. 6 is a partial perspective view showing the external appearance of the rear part of a motor vehicle to which the embodiment is applied.

With the trailer hitch device of the above construction, only the portion of the coupling bowl 7a of the trailer hitch 7 protrudes beyond the rear bumper face 13, and the member beam 6 which is the mounting member of the trailer hitch 7 is completely covered with the rear bumper face 13, so that the external appearance of the rear part of the motor vehicle is favorable as illustrated in FIG. 6.

Besides, the member beam 6 is located at the position which is covered with the rear bumper face 13, so that the departure angle of the vehicle body is not affected at all, and the embodiment can secure a sufficient departure angle in contrast to the prior-art example.

Further, the member beam 6 is fixed to the firm rear bumper stays 8, so that the embodiment is more advantageous in strength than in the case of the fixation to the vehicle body floor 15.

In addition, since this embodiment utilizes the existing rear bumper stays 8 as the supporting members of the member beam 6, it is smaller in the number of components, lighter in weight and lower in cost than the prior art. Moreover, since the member beam 6 is structurally bolted to the rear bumper stays 8, it is easy of attachment and detachment.

Figure 7:
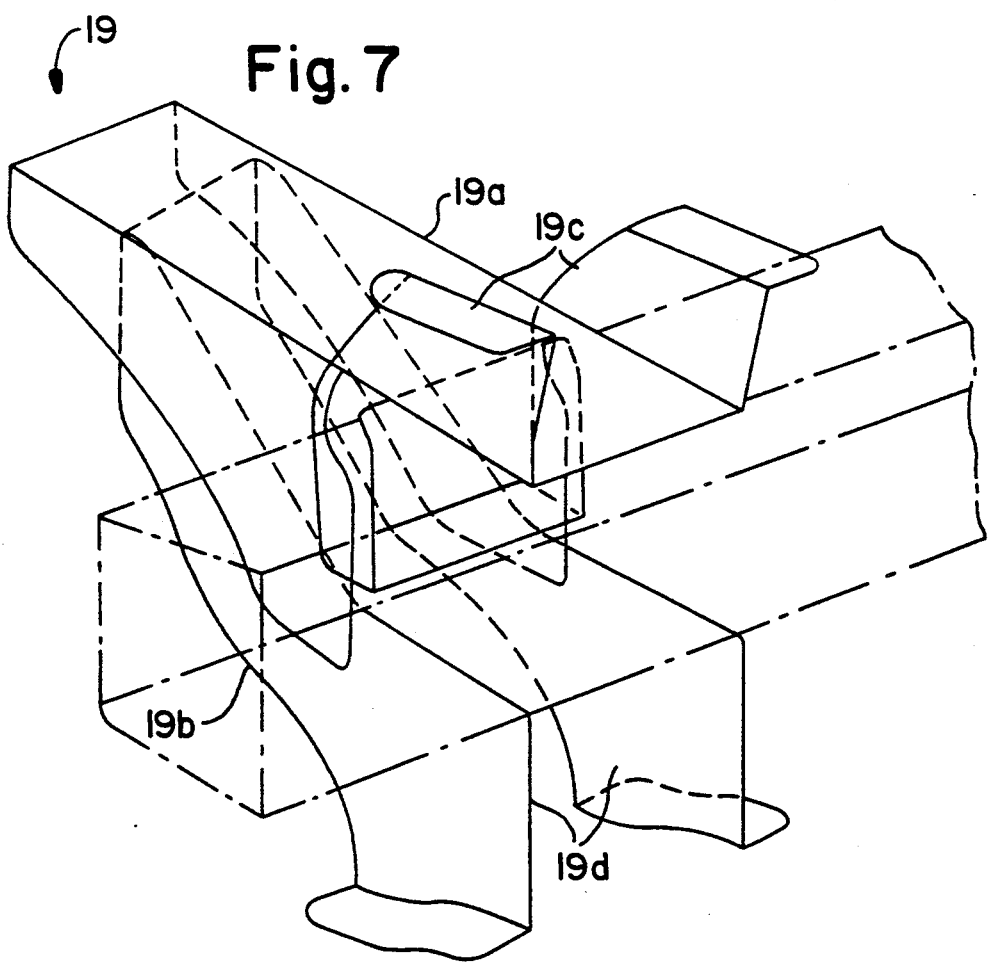
FIG. 7 is a perspective view of the essential portions of another embodiment of the present invention.
Figure 8:
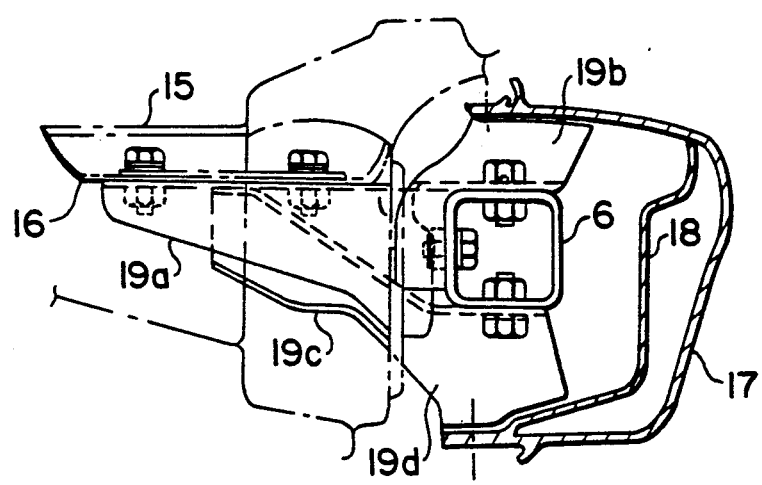
FIG. 8 is a sectional view of the other embodiment corresponding to FIG. 4.
Figure 9:
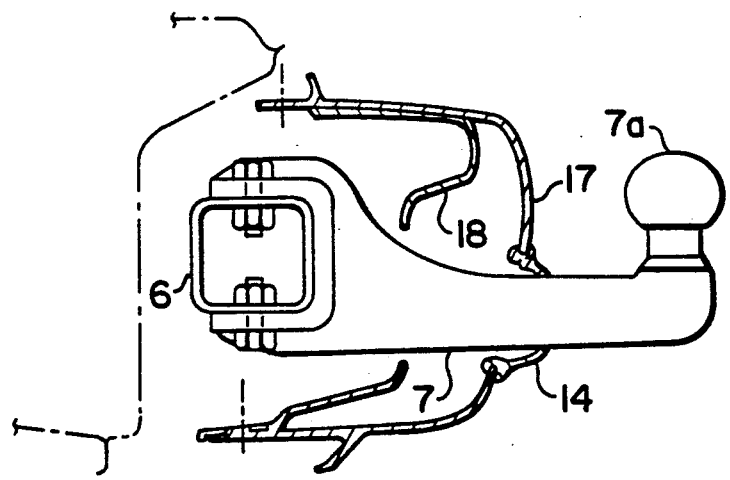
FIG. 9 is a sectional view of the other embodiment corresponding to FIG. 5.
Figure 10:
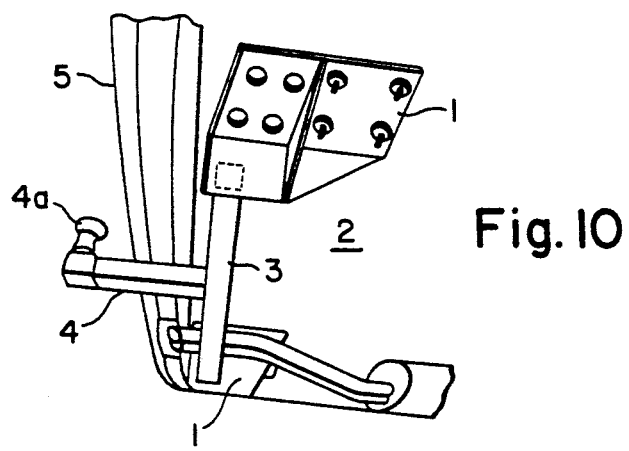
FIG. 10 is a perspective view of a part under the floor of a motor vehicle showing a prior-art example.
Figure 11:
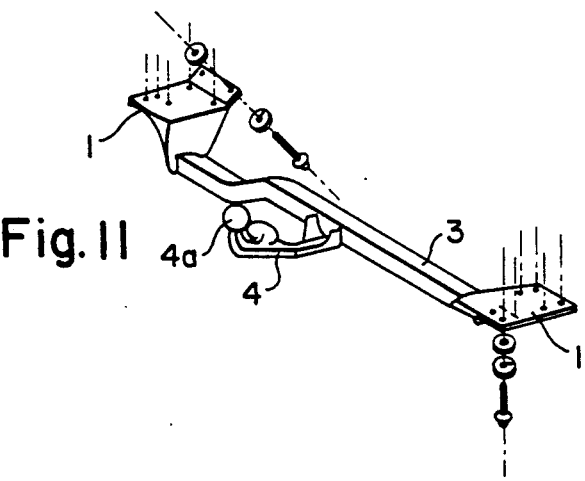
FIG. 11 is a perspective view showing the general construction of the prior-art example.
Figure 12:
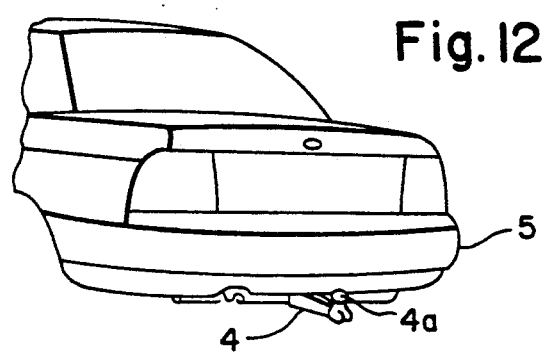
FIG. 12 is a perspective view of the rear part of the motor vehicle showing the prior-art example.

FIGS. 7 thru 9 show another embodiment of the present invention which is applied to a motor vehicle having a thin type rear bumper face 17.

In this case, a mounting member for the rear bumper face 17 is a single bumper beam 18 which has a U-shaped vertical section, and which is directly fixed to rear bumper stays 19 by screws. Since the other construction of this embodiment is substantially the same as in the foregoing embodiment, it shall be omitted from description by employing identical symbols.

Here, the rear bumper stay 19 is configured of a first element 19a located above, which has a surface to be mounted on the vehicle body of the motor vehicle, and a second element 19b located below, which is combined with the first element 19a. As shown in FIG. 7, mounting pieces 19c bent upwards, which serve to weld and fix the upper part of the bumper beam 18, are formed at the rear end part of the first element 19a, while mounting pieces 19d bent downwards, which serve to weld and fix the lower part of the bumper beam 18, are formed at the rear end part of the second element 19b.

Also with this embodiment, only the portion of the coupling ball 7a of a trailer hitch 7 protrudes beyond the rear bumper face 17, and a member beam 6 which is the mounting member of the trailer hitch 7 is completely covered with the rear bumper face 17 in built-in fashion, so that functional effects similar to those of the foregoing embodiment are attained.

As described above, according to the present invention, a member beam which is a mounting member for a trailer hitch is covered with a rear bumper face, so that the external appearance of the rear part of a motor vehicle can be made favorable.

Besides, the member beam is located at a position which is covered with the rear bumper face, so that the departure angle of the vehicle body can be sufficiently secured.

Further, the member beam is fixed to rear bumper stays, so that the invention is more advantageous in strength as compared with the technique in which the member beam is fixed to a vehicle body floor.

What is claimed is:

1. A trailer hitch device for a motor vehicle having a member beam connected to a body floor of said motor vehicle by right and left bumper stays and extending laterally behind said body, a pair of right and left brackets connected to each of said right and left bumper stays and extending upwardly and downwardly, an upper bumper beam supported at an upper end of said brackets, a lower bumper beam supported at a lower end of said brackets, and a rear bumper face for covering said member beam and said upper and lower bumper beams, the improvement in the device which comprises:

a trailer hitch replaceably mounted on said member beam at a center thereof and protruding rearwardly through said rear bumper face between said upper and lower bumper beams;

a boot inserted in a hole provided in said rear bumper face for said trailer hitch to penetrate therethrough;

a coupling ball mounted on said trailer hitch at the outwardly extending end thereof;

said bumper stay provided with a first groove for supporting said member beam therein by an upper flange and a lower flange;

said bracket provided with slot for inserting said upper and lower flanges therein so as to rigidly support said member beam;

said trailer hitch being formed with a second groove at the front end thereof for being fixedly supported on said member beam; and said rear bumper face being supported with said upper and lower bumper beams for covering all rear portions of said vehicle except said coupling ball so as to improve the external appearance of said vehicle.

2. The trailer hitch device according to claim 1, wherein said rear bumper comprises an upper bumper beam and a lower bumper beam, and said rear bumper face is supported by said upper and lower bumper beam.

3. The trailer hitch device according to claim 1, wherein said rear bumper comprises a U-shaped beam, and said rear bumper face is supported by said U-shaped beam.

* * * * *